Patented Mar. 2, 1954

2,670,782

UNITED STATES PATENT OFFICE 2,670,782

ALKYD RESIN LINOLEUM CEMENT

Charles G. Elliott, Lancaster, Pa., assignor to Armstrong Cork Company, Lancaster, Pa., a corporation of Pennsylvania No Drawing. Application June 8, 1951, Serial No. 230,705

6 Claims. (Cl. 154—25)

This invention relates to linoleum cement and linoleum compositions containing the same. More particularly, the invention relates to a linoleum cement containing an alkyd resin and a hydrocarbon drying oil. The invention also contemplates a method of making linoleum cements containing alkyd resins and hydrocarbon drying oils.

Linoleum, the widely-used hard surface floor covering, is manufactured from a linoleum composition which contains a filler, coloring pigments, and a binder, known in the art as linoleum cement. While various materials have been suggested for use in the manufacture of linoleum binders or linoleum cements, substantially all of the commercially used linoleum cements contain an oxidized siccative oil and a resin. A number of siccative oils, including drying oils and semi-drying oils, have been used, such as linseed oil, tung oil, soya bean oil, and various compositions containing blends of linseed oil, soya bean oil, and other materials, such as tall oil; however, the most widely used drying oil is linseed oil because of its peculiar properties, which make it most suitable for use in preparing binders for linoleum compositions. A number of resins, both natural and synthetic, have been tried in the manufacture of linoleum cements. Examples of such resins are rosin, congo gum, kauri gum, phenol formaldehyde resin, and alkyd resins. Rosin is by far the most widely used resinous material. The linseed oil-rosin combination is particularly adapted for the manufacture of linoleum cement, inasmuch as the oil is generally oxidized in the presence of the resin, which serves as a peptizer or a gel retarding agent during the oxidation process. In other words, it enables a substantial amount of oxidation of the oil to take place before the oil becomes so viscous due to gelation that it is impossible to pass additional quantities of oxygen through the reaction mass. Following the preparation of the binder material by passing air through a mixture of rosin and linseed oil, the product is generally allowed to cool and solidifies into large masses, which are cut up and admixed with pigments and fillers to produce the desired color formulation. The resulting formulation, generally referred to in the art as linoleum composition, is then calendered or otherwise impressed upon a suitable carrier backing. The backing may be canvas, burlap, or saturated felt. At the present time, burlap is widely used in the manufacture of heavy gauge material, whereas a saturated felt material is normally used for light and medium gauge material.

After calendering the linoleum composition onto the backing, the material must be stoved for a rather long time in order to cure the wearing surface into the hard resilient composition so essential for high quality floor covering.

While linoleum as manufactured on a large scale today possesses many desirable properties, such as resilience, flexibility, resistance to indentation, and the like, the product, because of the presence of a siccative oil-resin gel in its binder, is not highly resistant to alkali. Therefore, considerable care must be taken in the maintenance of the material. All manufacturers recommend that only mild cleaners be used in the maintenance of linoleum floor coverings. Harsh soaps cannot be used because of the lack of alkali resistance in the binder. It is also not possible to install linoleum floor covering on grade or below grade due to the alkali which is emitted by concrete. Such alkali reacts with the binder, and eventually causes disintegration of the flooring material.

With this limitation in alkali resistance in mind, many have attempted to prepare a linoleum binder which possesses the highly desired characteristic of being resistant to alkali. In order to provide the desired alkali resistance, methods have been proposed for utilizing alkyd resins in the production of a linoleum binder. Such resins are well known in the art and normally comprise the reaction product of a polycarboxylic acid with a polyhydric alcohol. Phthalic acid and maleic acid in the form of their anhydrides are typical examples of alkyd forming polycarboxylic acids; and glycerine and the glycols, such as ethylene glycol, are typical examples of alkyd forming polyhydric alcohols. In recent years, alkyd resins have been manufactured from higher polyhydric alcohols, such as pentaerythritol. The oil modified alkyds have also been prepared and are well known in the art. Such alkyd resins may be prepared by reacting a polyhydric alcohol, such as glycerine, linseed oil, and a polycarboxylic acid anhydride, such as phthalic anhydride, in a suitable reaction vessel.

However, when attempts were made to produce linoleum type floor covering utilizing alkyd resins as the binder in the linoleum composition, the material after curing exhibited what is known in the art as a soft center. In addition, the cured sheets were unusually hard and brittle on the surface. Such properties are undesirable in floor coverings of the linoleum type.

I have found that oil modified alkyd resins may be admixed with selected hydrocarbon drying oils and subjected to oxidation conditions while dispersed on a finely divided filler material to produce valuable linoleum cements. These cements may be compounded with pigments and other ingredients of a linoleum formula and deposited upon any of a number of conventional carriers, such as burlap, asphalt saturated felt, and the like, to produce a sheet of floor covering which, after stoving or curing in conventional stoves, possesses highly desirable properties. In addition to possessing the usual properties of resilience, flexibility, and wear resistance, the linoleum prepared in accordance with my invention is characterized by unusual alkali resistance, inasmuch as the binder is free from any of the drying oil type cements heretofore employed.

The oil-modified alkyd resins which may be employed to advantage in the practice of my invention are those obtained by reacting a siccative oil, an alkyd forming polyhydric alcohol, and an alkyd forming dicarboxylic acid. As pointed out above, such alkyd resins are well known in the art. Generally speaking, the reactants are used in the following proportions, which are given by way of example and not by limitation:

Polyhydric alcohol ____ About 12% to about 15%
Dicarboxylic acid _____ About 20% to about 23%
Siccative oil _____ About 45% to about 70%

Generally speaking, the reaction mass contains about 65% siccative oil, about 15% polyhydric alcohol, and about 20% dicarboxylic acid.

By the terms "siccative oil," I mean to include glyceride drying oils, such as linseed oil, tung oil, and the like, and glyceride semi-drying oils, such as soya bean oil, safflower oil, and the like. These oils are vegetable oils, but animal oils may be used. I have obtained particularly advantageous results when utilizing an alkyd-forming polyhydric alcohol containing at least three hydroxyl groups. Examples of such polyhydric alcohols are glycerine and pentaerythritol. The preparation of a typical oil-modified alkyd resin employed in the practice of my invention is disclosed in the following specific example:

*Example I*

1300 parts by weight of alkali refined soya bean oil were heated to 400° F. in approximately 50 minutes. 302 parts by weight of pentaerythritol were added in two portions over a 10-minute interval while maintaining the temperature close to 400° F. As soon as all of the pentaerythritol was added, the temperature was raised in 30 minutes to 450° F. 1.3 parts by weight of litharge catalyst was added, and the temperature was raised to 485° F. in 30 minutes. The temperature was maintained at 485° F. for 30 minutes to accomplish alcoholysis of the oil. At the end of the alcoholysis period, the temperature was reduced rapidly to 450° F., and within a period of 10 minutes 378 parts by weight of phthalic anhydride were added in two portions. Thereafter, 20 parts by weight of maleic anhydride were added. The temperature was maintained between 435° F. and 450° F. during this period. After addition of the acids, the temperature was taken to 450° F. and the batch was held at this temperature until the acid number reached 11.1 and the viscosity was 445 seconds in a Gardner-Holdt tube. The batch was under agitation during the whole cycle, and carbon dioxide was bubbled through the batch at a rate of .04 cubic feet per minute after addition of the acids and until completion of the reaction. After the desired viscosity was reached, the batch was cooled rapidly within 30 minutes to about 300° F. and then more slowly, after removal from the kettle to room temperature.

Other catalysts which may be employed in preparing the alkyd resins are lime, calcium naphthenate, lithium naphthenate, and the like.

In one embodiment of my invention, a drying oil modified alkyd resin, which may be a reaction product of soya bean oil, pentaerythritol, and maleic anhydride, is admixed with a selected hydrocarbon drying oil to produce a composition containing about 10% to 25% by weight hydrocarbon drying oil and about 90% to 75% by weight alkyd resin. In the practice of my invention, when the resin oil mixture contains more than about 25% selected hydrocarbon drying oil, the resulting material is too brittle for use as a resilient hard surface floor covering. When less than about 10% selected hydrocarbon drying oil is employed in the mixture, there is difficulty in stopping the reaction at the proper time. In other words, the reaction proceeds so fast that the resulting product is not capable of forming a sheet in the subsequent steps of the operation. The thus prepared hydrocarbon drying oil-resin mixture is then uniformly distributed over a mass of filler particles, which may be any of the filler materials normally used in the manufacture of linoleum composition. Examples of such fillers are wood flour, cork particles, and the like. The mixture of alkyd resins, selected hydrocarbon oil, and filler is then subjected to oxidation at elevated temperatures. Generally speaking, the mass is heated with agitation at a temperature between about 300° F. and 350° F. while passing air therethrough. When temperatures below about 300° F. are employed in this stage of the process, the time required to produce a suitable linoleum cement is so long as to be impractical. When temperatures substantially above about 350° F. are employed in the first stage of the process, the product is quite dark due to scorching of the filler particles. While such cements may be used in darker colors, there is a definite problem presented when it is desired to formulate a light-colored floor covering. The time required to complete the first stage of the process may be varied, depending, among other things, upon the quantity of selected hydrocarbon drying oil present, the temperature employed during oxidation, and the like. Generally speaking, the time may vary between about 30 minutes to about 150 minutes.

Following production of the binder in the manner indicated above, the mass is removed from the oxidizer and conventional pigments may be incorporated therewith to produce a desired color. The mixture of cement, filler, and pigment is broken down into fine particles and deposited upon a suitable backing. The sheet is consolidated, either by a calender or, if desired, by hydraulic presses. The resulting sheet is then passed into the stoves and subjected to a stoving or curing operation for a period of time sufficient to give the desired properties in the final product. The temperature of cure varies between about 180° F. to about 200° F. and is advantageously approximately 195° F. The time in the stoves varies, depending upon the particular composition being subjected to stoving, and normally varies between about 16 to about 144 hours.

In another embodiment of my invention, a linoleum composition may be prepared by compounding the selected hydrocarbon drying oil, the alkyd resin, the filler, and the pigment and other coloring matter used to produce a given color. The mass is oxidized in the same manner as indicated above. The resulting mass is subdivided, deposited upon a backing, compressed, and cured.

It is, of course, possible to produce a master batch of cement without color pigment and thereafter incorporate the desired color in a portion of the cement which has been previously prepared.

While a number of hydrocarbon drying oils may be used as peptizers in the practice of my invention, I have obtained particularly advantageous results when employing a peptizer which is a polymer obtained as a byproduct in the pyrolysis of petroleum. This material is generally cyclic in character and contains about 10% aromatic hydrocarbons. It boils in the range of 200° C. to 500° C. and has an iodine number of about 190 to 250, advantageously about 230 to 250, and it has an acid number of about 2. The material contains about one double bond for every fourteen carbon atoms in the molecules and has some conjugation. Nearly all of the molecules in the material are of a cyclic structure. The average molecular weight of the material is about 400 and it has a ring content of about 78%. The paraffin and side chains in the material are about 22%. Such material is sold by Sun Oil Company under the trade name "PDO 40."

My invention may be more readily understood by reference to the following specific examples:

*Example II*

Parts by weight
Alkyd resin (reaction product of soya bean oil, pentaerythritol, and maleic anhydride) _____ 11.11
Petroleum drying oil (PDO 40) _____ 1.24
Wood flour_____ 12.90
Whiting _____ 3.26
Titanium dioxide_____ 3.43

In producing the composition, the ingredients were charged to an oxidizer and agitated in air for 30 minutes while maintaining a temperature of 325° F.

*Example III*

Parts by weight
Alkyd resin (reaction product of soya bean oil, pentaerythritol, and maleic anhydride) _____ 9.88
Petroleum drying oil (PDO 40) _____ 2.47
Wood flour_____ 12.90
Whiting _____ 3.26
Titanium dioxide_____ 3.43

The reactants were charged to an oxidizer and heated with agitation in air at a temperature of 325° F. for 40 minutes to obtain a linoleum composition.

*Example IV*

Parts by weight
Alkyd resin (reaction product of soya bean oil, pentaerythritol, and maleic anhydride) _____ 232.0
Petroleum drying oil (PDO 40) _____ 77.4
Wood flour_____ 324.0
Whiting _____ 81.6
Titanium dioxide_____ 86.0

The reactants were charged to an oxidizer and heated with agitation in air at a temperature of 300° F. for 80 minutes to obtain a linoleum composition.

The finely divided solids content, which, for the purposes of my invention includes filler and pigment, may be varied without departing from the spirit of my invention. Generally speaking, compositions prepared in accordance with my invention contain about 35% to about 45% binder, including alkyd resin and selected hydrocarbon oil, and about 55% to about 65% finely divided solids. Particularly advantageous results are obtained when the composition contains about 38% binder and about 62% finely divided solids.

Although my invention has been particularly described with reference to hydrocarbon drying oils as the peptizer, when alkali resistance is of minor importance other peptizers may be employed in producing linoleum compositions in accordance with the process of my invention. For example, rosin may be substituted for the selected hydrocarbon drying oil where alkali resistance is no particular problem. However, in order to obtain resistance to alkali, it is necessary to utilize a hydrocarbon drying oil as the peptizer in the practice of my invention.

As can be seen from the above description, the binder of my floor covering composition is produced in situ, so to speak, inasmuch as the oil-modified alkyd resin and peptizer are heated in air while dispersed upon at least a portion of the finely divided solids content of the flooring formula. This practice is followed in order to overcome the disadvantages of a soft center, hereinbefore mentioned.

My invention has been described with particular reference to the production of a floor covering; however, the compositions may be used in the manufacture of wall coverings, desk tops, and the like.

I claim:

1. A binder for hard surface floor coverings comprising the plastic mass produced by oxidizing a mixture containing about 75% to 90% by weight of a glyceride siccative oil modified alkyd resin and about 25% to 10% by weight of a cyclic petroleum hydrocarbon fraction obtained as a by-product of the pyrolysis of petroleum, said fraction boiling between about 200° C. and 500° C., containing about 10% aromatics and having an iodine number of about 190 to 250.

2. A floor covering binder comprising a product obtained by oxidizing a mixture containing about 75% to 90% of an alkyd resin produced by reacting soya bean oil, pentaerythritol, and maleic anhydride; and about 10% to 25% by weight of a cyclic petroleum hydrocarbon fraction obtained as a by-product of the pyrolysis of petroleum, said fraction boiling between about 200° C. to 500° C., containing about 10% aromatics and having an iodine number of about 190 to 250.

3. A method of making a hard surface floor covering comprising mixing a glyceride siccative oil modified alkyd resin with a hydrocarbon drying oil, uniformly dispersing said resin-oil mixture over a mass of finely divided filler particles, heating the resulting mass in air at a temperature of between about 300° F. to about 325° F. for a period of time sufficient to produce a plastic mass, subdividing the resulting mass, depositing said subdivided mass onto a carrier backing, consolidating said mass to form a sheet, and heating said sheet in air at a temperature between about 180° F. and about 200° F. until a resilient hard surface floor covering is obtained, said hydrocarbon drying oil being a cyclic petroleum hydrocarbon fraction obtained as a by-product of the pyrolysis of petroleum, boiling between about 200° C. and 500° C., containing about 10% aromatics and having an iodine number of about 190 to 250.

4. A binder for hard surface floor covering comprising the plastic mass produced by oxidizing, while dispersed on finely divided solids, a mixture containing about 75% to 90% by weight of a glyceride siccative oil modified alkyd resin, and about 25% to 10% by weight of a cyclic petroleum hydrocarbon fraction obtained as a by-product of the pyrolysis of petroleum, said fraction boiling between about 200° C. and 500° C., containing about 10% aromatics and having an iodine number of about 190 to 250.

5. A floor covering binder comprising a product obtained by oxidizing while dispersed on finely divided solids a mixture containing about 75% to 90% on an alkyd resin produced by reacting soya bean oil, pentaerythritol, and maleic anhydride; and about 10% to 25% by weight of a cyclic petroleum hydrocarbon fraction obtained as a by-product of the pyrolysis of petroleum, said fraction boiling between about 200° C. to 500° C., containing about 10% aromatics and having an iodine number of about 190 to 250.

6. A floor covering binder comprising a product obtained by oxidizing a mixture containing about 75% to 90% of an alkyd resin produced by reacting a glyceride siccative oil, an alkyd forming polyhydric alcohol containing at least three hydroxyl groups, and an alkyd forming dicarboxylic acid; and about 10% to 25% by weight of a cyclic petroleum hydrocarbon fraction obtained as a by-product of the pyrolysis of petroleum, said fraction boiling between about 200° C. to 500° C., containing about 10% aromatics and having an iodine number of about 190 to 250.

CHARLES G. ELLIOTT.

References Cited in the file of this patent

UNITED STATES PATENTS

| Number | Name | Date |
|---|---|---|
| 1,872,568 | Ellis | Aug. 16, 1932 |
| 1,927,540 | Bonney | Sept. 19, 1933 |
| 2,078,194 | Collins | Apr. 20, 1937 |
| 2,371,074 | Spencer | Mar. 6, 1945 |
| 2,467,958 | Bloch | Apr. 19, 1949 |